United States Patent
Mick et al.

(10) Patent No.: US 12,012,833 B2
(45) Date of Patent: Jun. 18, 2024

(54) OFFSHORE OIL AND GAS POWER GENERATION WITH CARBON CAPTURE AND BENEFICIAL USE OF CO2

(71) Applicant: Exmar Offshore Company, Houston, TX (US)

(72) Inventors: Martin B. Mick, Houston, TX (US); Chirag Parmar, Houston, TX (US)

(73) Assignee: Exmar Offshore Company, Houston, TX (US)

(*) Notice: Subject to any disclaimer, the term of this patent is extended or adjusted under 35 U.S.C. 154(b) by 155 days.

(21) Appl. No.: 17/657,946

(22) Filed: Apr. 4, 2022

(65) Prior Publication Data

US 2022/0316304 A1    Oct. 6, 2022

Related U.S. Application Data

(60) Provisional application No. 63/170,274, filed on Apr. 2, 2021.

(51) Int. Cl.
*E21B 43/16* (2006.01)
*E21B 41/00* (2006.01)
*E21B 43/01* (2006.01)

(52) U.S. Cl.
CPC ........ *E21B 43/164* (2013.01); *E21B 41/0064* (2013.01); *E21B 43/01* (2013.01); *E21B 41/0085* (2013.01)

(58) Field of Classification Search
None
See application file for complete search history.

(56) References Cited

U.S. PATENT DOCUMENTS

| | | | |
|---|---|---|---|
| 2007/0237696 A1* | 10/2007 | Payton | E21B 43/40 423/228 |
| 2011/0000221 A1* | 1/2011 | Minta | F01K 23/068 60/722 |
| 2014/0020398 A1* | 1/2014 | Mittricker | F02C 7/141 60/39.52 |
| 2016/0339359 A1* | 11/2016 | Hallot | E21B 43/36 |
| 2017/0104329 A1* | 4/2017 | Boe | H02P 27/06 |
| 2020/0284945 A1* | 9/2020 | Khan | G06F 30/20 |

FOREIGN PATENT DOCUMENTS

WO     WO9963210     * 12/1999     ............... F02C 3/34

* cited by examiner

*Primary Examiner* — Anuradha Ahuja
(74) *Attorney, Agent, or Firm* — Osha Bergman Watanabe & Burton LLP

(57) ABSTRACT

In a system for producing power and capturing carbon dioxide (CO2) at an offshore site, separator units separate a fluid produced from an offshore vessel in fluid communication with a reservoir into water, oil, and gas. The gas is sent to oxy-firing gas turbine generator units. Air separation units separate an air into nitrogen and oxygen. The oxygen is sent to the oxy-firing gas turbine generator units. Gas compression units compress an exhaust gas from the oxy-firing gas turbine generator units. Dehydration units dehydrate the compressed exhaust gas, and a portion of the dehydrated compressed exhaust gas is recycled back to the oxy-firing gas turbine generator units. Gas pumps inject a remaining portion of the dehydrated compressed exhaust gas into the reservoir. Additionally, the oxy-firing gas turbine generator units generates electricity with the oxygen, the gas, and the portion of the dehydrated compressed exhaust gas.

10 Claims, 2 Drawing Sheets

OFFSHORE OIL AND GAS POWER GENERATION WITH CARBON CAPTURE AND BENEFICIAL USE OF CO2

FIELD OF THE DISCLOSURE

Embodiments of the present disclosure generally relate to offshore oil and gas production, including power generation, carbon capture, and enhanced oil recovery using the captured carbon. Carbon capture and its use for enhanced oil recovery refers to more specifically to carbon dioxide ($CO_2$).

BACKGROUND

Offshore oil and gas developments require significant on-platform power generation as an integral part of the oil and gas recovery operations. That power generation is produced by burning fossil fuels, most typically natural gas, in commercially sized gas turbine generators. In that process, $CO_2$ is emitted into the atmosphere from the gas turbine exhaust, where the $CO_2$ is not captured from the offshore oil and gas facilities.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a system for producing power and capturing carbon dioxide ($CO_2$) at an offshore site. The system may include an offshore vessel in fluid communication with a reservoir; one or more separator units configured to separate a fluid produced from the reservoir into a water fraction, an oil fraction, and a gas fraction; one or more oxy-firing gas turbine generator units, the oxy-firing unit is configured to receive as a fuel input the gas fraction separated by the one or more separator units; one or more air separation units configured to separate an air into nitrogen and oxygen, the oxy-firing unit is configured to receive oxygen from the one or more air separation units; one or more gas compression units configured to compress an exhaust gas from the one or more oxy-firing gas turbine generator units to produce a compressed exhaust gas; one or more dehydration units configured to dehydrate the compressed exhaust gas from the one or more gas compression units to produce a dehydrated compressed exhaust gas, the oxy-firing unit is configured to receive a portion of the dehydrated compressed exhaust gas; and one or more gas pumps configured to pump a remaining portion of the dehydrated compressed exhaust gas. Additionally, the one or more oxy-firing gas turbine generator units is configured to generate electricity with the oxygen, the gas, and the portion of the dehydrated compressed exhaust gas.

In another aspect, the embodiments disclosed herein relate to a method for generating power and capturing carbon dioxide ($CO_2$) at an offshore site. The method may include producing fluids from a reservoir; feeding a gas, separated from the produced fluids with a separator unit, into an oxy-firing gas turbine generator unit; feeding oxygen, separated from an air with an air separation unit, into the oxy-firing gas turbine generator unit; compressing, with a compression unit, an exhausted gas from the oxy-firing gas turbine generator unit to produce a compressed exhaust gas; dehydrating, with a dehydration unit, the compressed exhaust gas to produce a dehydrated gas; feeding a portion of the dehydrated gas to the oxy-firing gas turbine generator unit; generating electricity with the oxy-firing gas turbine generator unit using the gas, the oxygen, and the portion of the dehydrated gas; and transmitting the electricity to an offshore vessel in fluid communication with the reservoir and/or to other offshore facilities.

Other aspects and advantages of the disclosure will be apparent from the following description and the appended claims.

DETAILED DESCRIPTION

Figure 1:
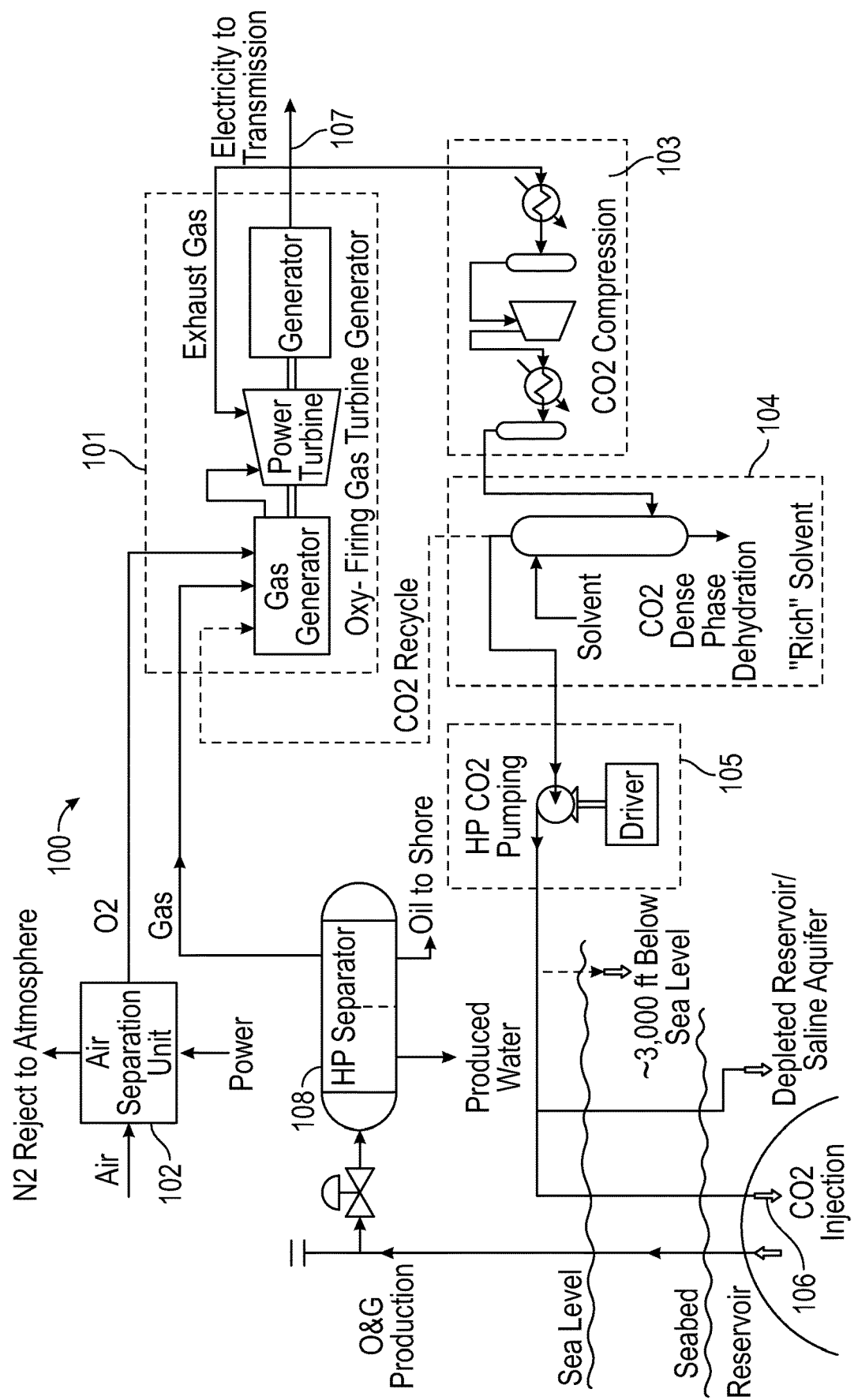
FIG. 1 illustrates a process flow diagram of systems and processes for producing oil, generating power, and capturing carbon according to one or more embodiments disclosed herein.

Specific embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description. Wherever possible, like or identical reference numerals are used in the figures to identify common or the same elements. The figures are not necessarily to scale and certain features and certain views of the figures may be shown exaggerated in scale for purposes of clarification.

Embodiments herein relate to a power production and carbon dioxide ($CO_2$) capture system to economically minimize the gas turbine exhaust, to enable more cost-efficient $CO_2$ capture. In the $CO_2$ capture system, the captured $CO_2$ is not emitted to the atmosphere. The captured $CO_2$ is: used to beneficially increase the ultimate oil and gas recovery from the underground reservoir; alternatively, depending on location, the captured $CO_2$ can be safely disposed in an underground, deep depleted reservoir for enhanced oil recovery or pressure maintenance, or in a deep underground saline aquifer. Further, in the event neither of these options for disposal are available, the captured carbon can be injected into the deep ocean, at water depths exceeding 3,000 ft, where the injected $CO_2$ will exist as a stable fluid. Excess power generated above that which is needed for the oil and gas development may be made available for transmission to other facilities, such as other offshore facilities. In turn, this would result in reduced power generation at those other facilities, or negating the need for power generation at those other facilities, further minimizing $CO_2$ emissions from those other facilities or simplifying the design of facilities that may be used in association with systems and vessels according to embodiments herein.

Systems for producing power and capturing carbon dioxide ($CO_2$) at an offshore site according to embodiments herein may include an offshore vessel in fluid communication with a reservoir, such as a floating production unit. Fluids produced from the reservoir and received by the floating production unit may include water, including produced or injected water, and hydrocarbons, including oil and gas (including light hydrocarbons such as methane and ethane, for example). One or more separation units may be used to separate the produced fluids into a water fraction, an oil fraction, and a gas fraction. The separation units may include, for example, a high pressure separator for separating light hydrocarbons useful as a fuel, such as methane and ethane, from the produced fluids. One or more additional separators may be provided to produce a stabilized oil fraction. The oil fraction, or a stabilized oil fraction, recovered from the one or more separation units may then be transmitted to an onshore facility for further processing or to an oil tanker for transport and further processing, for example.

The system may also include one or more air separation units configured to separate air into nitrogen and oxygen. The nitrogen stream may be vented to atmosphere or may be recovered for use in one or more additional systems associated with the offshore facility. The oxygen, which may have a purity of at least 95 mol %, such as greater than 98, 99, or 99.5 mol %, may be recovered and used as a combustion gas.

The light hydrocarbon gases recovered from the one or more separation units and the relatively pure oxygen combustion gas recovered from the one or more air separation units may be fed to an oxy-firing gas turbine generator unit for generation of power and/or electricity. The oxy-firing unit is configured to receive oxygen (as a combustion gas) from the one or more oxy-firing gas turbine generator units, as well as the gas (as a fuel input) from the one or more separation units, and to combust the gas and oxygen, producing an exhaust gas that may drive a turbine, thereby producing electricity in the generator.

The exhaust gas, rather than being vented to atmosphere, may be fed to one or more exhaust gas compression units. Because of the relatively pure oxygen combustion gas, and the light hydrocarbon gas fuel, the exhaust gas may contain primarily carbon dioxide and water. In some embodiments, the exhaust gas consists essentially of carbon dioxide and water. Sulfur or sulfide separation units may be provided upstream or downstream of the oxy-firing gas turbine generator unit, if needed.

The exhaust gas compression unit is configured to receive and compress an exhaust gas from the one or more oxy-firing gas turbine generator units, producing a compressed exhaust gas. The exhaust gas compression unit may include a heat exchanger receiving the exhaust gas and cooling the exhaust gas to a temperature suitable for compression. In some embodiments, the heat exchanger may be or may include a feed/effluent exchanger, pre-heating the hydrocarbon fuel gas fed to the oxy-firing gas turbine generator. Additional exchangers, such as an exchanger indirectly cooling the exhaust gas with sea water or air, may alternatively or additionally be used to produce a cooled exhaust gas.

The initial cooling of the exhaust gas may result in condensation of some of the water within the exhaust gas. A compressor feed knock-out drum may be provided to separate the cooled exhaust gas from any condensed water so as to provide a liquid-free exhaust gas to the compressor. Any after-cooler and a compressor discharge knock-out drum may also be provided to cool the compressed exhaust gas and to recover any additional condensate resulting from the compression and after-cooling, thereby producing a cooled and compressed exhaust gas.

The cooled and compressed exhaust gas may then be fed to one or more dehydration units configured to dehydrate (remove water from) the compressed exhaust gas, thereby producing a compressed gas stream rich in $CO_2$. In some embodiments, the compressed gas stream may consist of or consist essentially of $CO_2$ following dehydration. The $CO_2$ dehydration unit may include adsorption units or extraction units respectfully using adsorbents or solvents useful for separating water from the compressed exhaust stream. The $CO_2$ dehydration unit may further include regeneration systems or units for regenerating the solvent or adsorbents. Embodiments herein may thus include regenerating the solvents or adsorbents for continued use in removing water from the compressed exhaust stream. For example, nitrogen recovered from the air separation unit may be heated, such as in indirect heat exchange for cooling the exhaust gas from the oxy-firing gas turbine generator, and the hot nitrogen may be used to regenerate the adsorbent. Similarly, heat from the exhaust gas may be used to boil water away from a rich solvent stream, producing a lean solvent stream useful for removing water from the compressed exhaust gas. Other methods for regenerating the adsorbent or the solvent may also be used.

The resulting dehydrated compressed exhaust gas may contain primarily $CO_2$, as noted above. The carbon dioxide may be recovered for use in one or more enhanced oil recovery operations, such as for $CO_2$ gas injection, $CO_2$ foam injection, or other enhanced oil recovery operations. Alternatively, or additionally, the dehydrated compressed exhaust gas may be injected into a reservoir or a depleted reservoir, such as to maintain a pressure within the reservoir so as to maintain stable oil production potential. In other embodiments, the dehydrated exhaust may be injected into a saline aquifer or may be disposed of in other manners, such as by injection into a body of water at a depth of at least 3000 feet, where the compressed exhaust gas may remain as a stable fluid.

In some embodiments, a portion of the dehydrated exhaust gas may be used to enhance efficiency of the oxy-firing gas turbine generator. The oxy-firing unit may be configured to receive a portion of the dehydrated compressed exhaust gas, mixing the carbon dioxide with the air and fuel, thereby enhancing the volume of gas heated during the combustion process and improving the overall efficiency of the turbine generator.

One or more gas pumps may be provided to pump a remaining portion of the dehydrated compressed exhaust gas. The gas pumps may be configured to pressurize the dehydrated exhaust, such as for injection or disposal, as noted above. In some embodiments, the one or more gas pumps may be fluidly connected to an injection system, such as for direct injection of the pressurized carbon dioxide into a reservoir, or for mixing with surfactants and water for foam injection, for example. The injection system may be located on the same offshore vessel or may be located on a nearby offshore vessel, such as a nearby vessel used primarily for injection of fluids into an injection well pushing reservoir fluids to a production well fluidly connected to the one or more separation units.

The one or more oxy-firing gas turbine generator units is configured to generate electricity with the oxygen and the gas. In some embodiments, the one or more oxy-firing gas turbine generators is configured to generate electricity with the oxygen, gas, and the portion of the dehydrated compressed exhaust gas.

The generated electricity may be more than is needed for the vessel on which the power generation and CO2 capture system is disposed. In some embodiments, such as for regional oil field development initiatives, systems herein may further include a power transmission or electrical distribution system for transmitting power to one or more additional offshore vessels. The additional offshore vessels may include support vessels, other floating production units, drilling vessels, injection vessels, or other offshore vessels requiring power.

The one or more oxy-firing gas turbine generator units, one or more air separation units, one or more separator units, one or more gas compression units, one or more dehydration units, and the one or more gas pumps may be disposed on a single offshore vessel in some embodiments.

A simplified process flow diagram of a carbon dioxide (CO2) capture system 100 according to one or more embodiments herein is shown in FIG. 1. The CO2 capture system 100 may be used to generate electricity from a reservoir at an offshore site on a single platform. The CO2 capture system 100 includes one or more oxy-firing gas turbine generator units 101, one or more air separation units 102, one or more CO2 gas compression units 103, one or more dense-phase CO2 dehydration units 104, one or more dense-phase CO2 pumps 105, reservoir injection fluid manifold 106, power transmission conduit 107, and one or more oil, gas, and water separation units 108. In one or more embodiments, one or more oxy-firing gas turbine generator units 101, one or more air separation units 102, one or more CO2 gas compression units 103, one or more dense-phase CO2 dehydration units 104, one or more dense-phase CO2 pumps 105, reservoir injection fluid 106, power transmission 107, and one or more oil, gas, and water separation units 108 may be disposed on the same offshore vessel in fluid communication with the reservoir.

The one or more oxy-firing gas turbine generator units 101 involves sending (reasonably) pure oxygen to a gas turbine generator of the one or more oxy-firing gas turbine generator units 101. When combined with the natural gas fuel, the resulting turbine exhaust in the one or more oxy-firing gas turbine generator units 101 is composed of primarily CO2 and water vapor. With only CO2 and water vapor, only gas compression and dehydration are needed to efficiently capture the CO2. The one or more oil, gas, and water separation units 108 may feed fuel gas to the one or more oxy-firing gas turbine generator units 101 from an oil and gas reservoir.

The one or more air separation units 102 separate air into primarily oxygen and nitrogen. The one or more air separation units 102 is used to provide the (reasonably) pure oxygen to the one or more oxy-firing gas turbine generator units 101.

In the one or more CO2 gas compression units 103, the captured CO2 is compressed to the thermodynamically CO2 dense-phase pressure, for example approximately 1,200 psi (liquid or supercritical CO2 preferred, such as at a pressure of 1100 psi to 2000 psi, depending upon temperature).

The one or more dense-phase CO2 dehydration units 104 may be used to mitigate water-wet CO2 corrosion. Dehydration is required to mitigate water-wet CO2 corrosion potential. If needed, a solvent may be used in the one or more dense-phase CO2 dehydration units 104 to extract water from the CO2. Additionally, a portion of the dehydrated CO2 in the one or more dense-phase CO2 dehydration units 104 must be recycled to the one or more oxy-firing gas turbine generator units 101. By recycling the portion of the dehydrated CO2, a volume of gas provided to the turbine and the associated power generation within the one or more oxy-firing gas turbine generator units 101 is increased. The increased volume of gas thereby improved efficiency and reduced fuel gas and oxygen requirements within the one or more oxy-firing gas turbine generator units 101.

The one or more dense-phase CO2 pumps 105 is used for pumping to reservoir injection pressure. The one or more dense-phase CO2 pumps 105 are thermodynamically more efficient than gas compressors, which results in reducing the overall power requirement to achieve the final CO2 disposal pressure.

The reservoir injection fluid manifold 106 is a high-pressure CO2 from one or more dense-phase CO2 pumps 105. The reservoir injection fluid manifold 106 may flow to the oil and gas reservoir, for either (i) reservoir miscible drive mechanism, which improves oil "mobility" within the reservoir formation, which results in increased ultimate reservoir recovery; and/or (ii) reservoir pressure maintenance to maintain oil production potential. Alternately, depending on location, the reservoir injection fluid 106 may be safely disposed in a depleted oil and gas reservoir, or into a nearby saline aquifer. Further, in the event that neither of these options are available, the reservoir injection fluid 106 may be injected into the deep ocean, at a water depth of approximately 3,000 ft., where the reservoir injection fluid 106 will remain as a stable fluid.

The power transmission 107 may be a high voltage power transmission to other facilities, located on the same platform as the power generation or transmitted to other local offshore facilities. The power transmission 107 may be either DC or AC power, depending on distance. Also depending on transmission distance, voltage level of the power transmission 107 may vary.

In one or more embodiments, fluids from the oil and gas reservoir are produced on an offshore vessel. On this offshore vessel, the fluids are separated using the one or more oil, gas, and water separation units 108. At the one or more oil, gas, and water separation units 108, the produced fluids from the oil and gas reservoir are separated into water, oil, and gas. As described above, the one or more separator units 108 may feed the separated gas to the one or more oxy-firing gas turbine generator units 101. Additionally, from the one or more oil, gas, and water separation units 108, the separated oil may be transported to a shore for use and the separated water may be transported for disposal or recycled.

Figure 2:
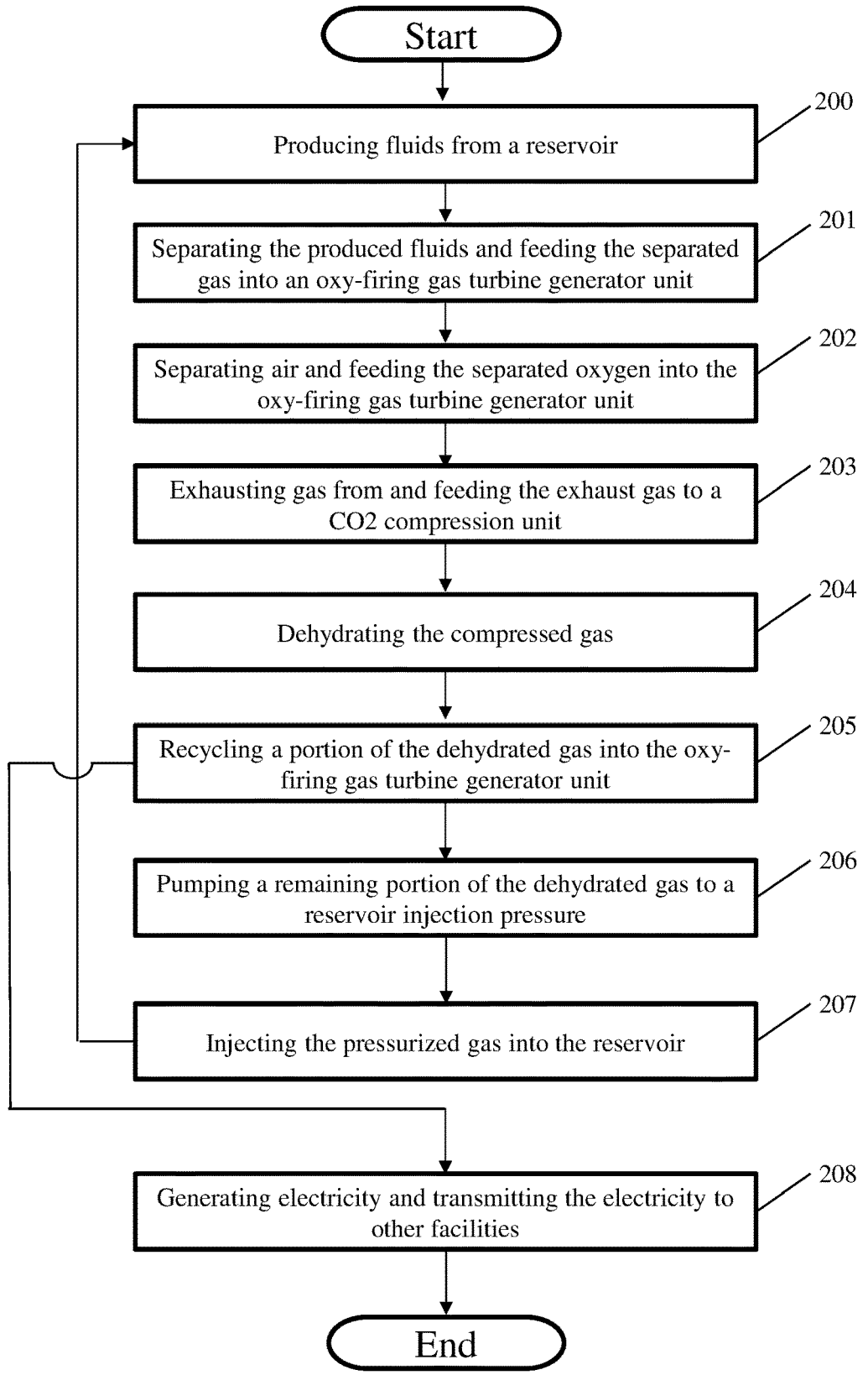
FIG. 2 illustrates a flowchart for producing oil, generating power, and capturing carbon in accordance with one or more embodiments of the present disclosure.

Referring to FIG. 2, a flowchart for using the CO2 capture system 100 at an offshore site is illustrated. One or more steps in FIG. 2 may be performed by one or more components, such as, a computing system coupled to a controller. For example, a non-transitory computer readable medium may store instructions on a memory coupled to a processor of a computer system such that the instructions include functionality for using the CO2 capture system 100.

In Step 200, fluids, such as hydrocarbons, from a reservoir are produced at the offshore site. For example, an offshore vessel is fluidly connected to the reservoir such that fluids from the reservoir flow to the offshore vessel. At the offshore vessel, the fluids may be separated in the one or more separators.

In Step 201, at the separator, the produced fluids are separated into water, oil, and the separated gas is fed into a turbine and associated power generation within the one or more oxy-firing gas turbine generator unit. For example, the separated gas may be fed into a gas generator of the oxy-firing gas turbine generator unit as fuel gas. Additionally, the separated oil may be transported to a shore for use and the separated water may be transported for disposal or recycled.

In Step 202, air is separated, with an air separation unit, into primarily oxygen and nitrogen, and the separated oxygen is fed into the turbine and associated power generation within the one or more oxy-firing gas turbine generator unit. It is further envisioned that the separated nitrogen is exhausted into the atmosphere.

In Step 203, gas is exhausted from the oxy-firing gas turbine generator unit and the exhausted gas is fed into a $CO_2$ compression unit via a cooling system. For example, a power turbine, coupled to the gas generator, produces exhaust gas based on the fuel gas and oxygen in the gas generator. In the $CO_2$ compression unit, the exhaust gas is compressed to a thermodynamically $CO_2$ dense-phase pressure, for example approximately 1,200 psi (liquid or supercritical $CO_2$ preferred, such as at a pressure of 1100 psi to 2000 psi, depending upon temperature).

In Step 204, the compressed gas is dehydrated. For example, a $CO_2$ dehydration unit dehydrates the compressed gas to mitigate water-wet $CO_2$ corrosion. It is further envisioned that a solvent may be used in the $CO_2$ dehydration unit to extract water from the compressed gas. The extracted water with the solvent may form a rich solvent to be removed from the $CO_2$ dehydration unit. In some embodiments, the solvent may be regenerated, recovering the water, which may be disposed or used for alternate operations on the vessel or transported away, and a lean solvent that may again be used for extracting water from the compressed gas.

In step 205, a portion of the dehydrated gas in the $CO_2$ dehydration unit is recycled back into a turbine and associated power generation within the one or more oxy-firing gas turbine generator units. The recycled gas increases a volume of gas provided to the turbine and the associated power generation within the one or more oxy-firing gas turbine generator unit. The increased volume of gas thereby improves efficiency and reduces fuel and oxygen requirements within the one or more oxy-firing gas turbine generator unit.

In Step 206, a remaining portion of the dehydrated gas in the $CO_2$ dehydration unit not recycled is pressurized, with a $CO_2$ pump, to a reservoir injection pressure.

In Step 207, the pressurized gas is injected into the reservoir. For example, after the remaining portion of the dehydrated gas reaches the reservoir injection pressure, the $CO_2$ pump injects the pressurized gas into the reservoir. The pressurized gas may be a high-pressure $CO_2$ injected into the reservoir. The injected fluid may be used for a reservoir miscible drive mechanism to improve oil "mobility" within the reservoir formation, which results in increased ultimate reservoir recovery. Additionally, the injected fluid may be used to maintain a reservoir pressure for stable oil production potential. Alternately, depending on location, the injected fluid may be safely disposed in a depleted oil and gas reservoir, or into a nearby saline aquifer. Further, in some embodiments, the injection fluid may be injected into the deep ocean, at a water depth of approximately 3,000 ft., where the injection fluid will remain as a stable fluid. From Step 207, the method may restart back at Step 200.

In Step 208, with the separated gas, the separated oxygen, and the recycled gas, the oxy-firing gas turbine generator unit generates electricity and transmitted the electricity to other facilities. For example, the other facilities may be located on the same platform as the offshore vessel or transmitted to other local offshore facilities or land facilities. The electricity may be either DC or AC power, depending on distance the electricity needs to travel. Also depending on transmission distance, a voltage level of the electricity may vary to meet the transmission distance requirements.

$CO_2$, as noted above, is not generally captured from offshore oil and gas facilities. In addition to the benefits described above, the $CO_2$ capture system using oxy-firing gas turbines may allow for offshore carbon capture and disposal, providing for both a $CO_2$ capture process and $CO_2$ disposal process for most offshore oil and gas developments. Further, the $CO_2$ capture system may be easily implemented in a "regional development" approach, for which several oil and gas discoveries could be developed regionally, with power generation from one or a few platforms including embodiments herein, resulting in significantly reduced combined $CO_2$ emissions. In the regional approach, power would be generated at only one or two facilities and transmitted to the others. In some embodiments, energy developments using the $CO_2$ capture system disclosed herein will be almost greenhouse gas emissions free.

Unless defined otherwise, all technical and scientific terms used have the same meaning as commonly understood by one of ordinary skill in the art to which these systems, apparatuses, methods, processes and compositions belong. The singular forms "a," "an," and "the" include plural referents, unless the context clearly dictates otherwise. As used here and in the appended claims, the words "comprise," "has," and "include" and all grammatical variations thereof are each intended to have an open, non-limiting meaning that does not exclude additional elements or steps. "Optionally" means that the subsequently described event or circumstances may or may not occur. The description includes instances where the event or circumstance occurs and instances where it does not occur. When the words "approximately" or "about" are used, these terms may mean that there can be a variance in value of up to ±10%, of up to 5%, of up to 2%, of up to 1%, of up to 0.5%, of up to 0.1%, or up to 0.01%. Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for producing power and capturing carbon dioxide ($CO_2$) at an offshore site, comprising:
   an offshore vessel in fluid communication with a reservoir;
   one or more separator units configured to separate a fluid produced from the reservoir into a water fraction, an oil fraction, and a gas fraction;
   one or more oxy-firing gas turbine generator units, wherein an oxy-firing unit of the one or more oxy-firing gas turbine generator units is configured to receive as a fuel input the gas fraction separated by the one or more separator units;
   one or more air separation units configured to separate an air into nitrogen and oxygen, wherein the oxy-firing unit is configured to receive the separated oxygen from the one or more air separation units;

one or more gas compression units configured to compress an exhaust gas to a pressure within a pressure range of 1,100 psi to 2,000 psi, wherein the exhaust gas comprises carbon dioxide and water, from the one or more oxy-firing gas turbine generator units to produce a compressed exhaust gas;

one or more dehydration units configured to dehydrate the compressed exhaust gas from the one or more gas compression units to produce a dehydrated compressed exhaust gas, wherein the oxy-firing unit is configured to receive a portion of the dehydrated compressed exhaust gas; and one or more gas pumps configured to pump a remaining portion of the dehydrated compressed exhaust gas into the reservoir, wherein the one or more oxy-firing gas turbine generator units is configured to generate electricity with the oxygen, the gas fraction, and the portion of the dehydrated compressed exhaust gas.

2. The system of claim 1, wherein the one or more oxy-firing gas turbine generator units, the one or more air separation units, the one or more separator units, the one or more gas compression units, the one or more dehydration units, and the one or more gas pumps are disposed on the offshore vessel.

3. The system of claim 1, wherein the one or more dehydration units comprises a solvent extraction unit and a solvent regeneration unit.

4. The system of claim 1, wherein the one or more gas pumps is fluidly connected to one or more injection systems configured to inject the remaining portion of the dehydrated compressed exhaust gas into the reservoir, a depleted oil and gas reservoir, a saline aquifer, or into a body of water.

5. The system of claim 1, further comprising an electrical distribution system configured to transmit a portion of the generated electricity to one or more additional offshore vessels.

6. A method for generating power and capturing carbon dioxide (CO2) at an offshore site, the method comprising:
producing fluids from a reservoir;

feeding a gas, separated from the produced fluids with a separator unit, into an oxy-firing gas turbine generator unit;

feeding oxygen, separated from an air with an air separation unit, into the oxy-firing gas turbine generator unit;

compressing, with a compression unit, an exhaust gas, wherein the exhaust gas comprises carbon dioxide and water, from the oxy-firing gas turbine generator unit to produce a compressed exhaust gas within a pressure range of 1,100 psi to 2,000 psi;

dehydrating, with a dehydration unit, the compressed exhaust gas to produce a dehydrated gas;

feeding a portion of the dehydrated gas to the oxy-firing gas turbine generator unit;

generating electricity with the oxy-firing gas turbine generator unit using the gas, the oxygen, and the portion of the dehydrated gas;

transmitting the electricity above sea level as DC or AC power, and setting a voltage level of the DC or AC power based on a transmission distance to an offshore vessel in fluid communication with the reservoir, to other offshore facilities, or both;

pumping, with a gas pump, a remaining portion of the dehydrated gas into the reservoir.

7. The method of claim 6, further comprising pressurizing, with the gas pump, the remaining portion of the dehydrated gas to a reservoir injection pressure.

8. The method of claim 7, further comprising injecting the pressurized dehydrated gas into the reservoir.

9. The method of claim 7, further comprising injecting the pressurized dehydrated gas into a depleted oil and gas reservoir, into a saline aquifer, or into a body of water.

10. The method of claim 6, wherein dehydrating the compressed gas further comprises extracting water with a solvent and regenerating the solvent.

* * * * *